United States Patent
Palmin et al.

(10) Patent No.: US 12,549,383 B2
(45) Date of Patent: Feb. 10, 2026

(54) SYSTEM AND METHOD FOR VERIFYING COMPONENTS OF AN INDUSTRIAL MONITORING SYSTEM

(71) Applicant: Siemens Aktiengesellschaft, Munich (DE)

(72) Inventors: Anna Palmin, Karlsruhe (DE); Xin Xie, Durmersheim (DE)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 18/019,646

(22) PCT Filed: Jul. 28, 2021

(86) PCT No.: PCT/EP2021/071108
§ 371 (c)(1),
(2) Date: Feb. 3, 2023

(87) PCT Pub. No.: WO2022/028975
PCT Pub. Date: Feb. 10, 2022

(65) Prior Publication Data
US 2024/0012404 A1 Jan. 11, 2024

(30) Foreign Application Priority Data
Aug. 4, 2020 (EP) .................................. 20189417

(51) Int. Cl.
*H04L 9/32* (2006.01)
(52) U.S. Cl.
CPC ................................ *H04L 9/3265* (2013.01)
(58) Field of Classification Search
CPC ... H04L 9/3265; H04L 63/20; H04L 63/0823; G06F 21/577; G06F 2221/034;
(Continued)

(56) References Cited

U.S. PATENT DOCUMENTS 5,841,865 A 11/1998 Sudia
9,787,477 B1 * 10/2017 Singal .................. H04L 9/3265
(Continued)

FOREIGN PATENT DOCUMENTS

CN  111143618 A  5/2020
EP  2 009 524 A2  12/2008
(Continued)

OTHER PUBLICATIONS

Crook Rod: "A World-Class SCVP Server for Infrastructure and Enterprise Use—RFC 5055 Validation Authority using Advanced Path Discovery and Validation"; retrieved from the internet: RL:https://www.ascertia.com/downloads/datasheets/ADSS-scvp-Server-datasheet.;pdf, 21.7.2022; Nov. 14, 2017.
(Continued)

*Primary Examiner* — Christopher A Revak
(74) *Attorney, Agent, or Firm* — Henry M. Feiereisen LLC

(57) ABSTRACT

A system for verifying components of an industrial monitoring system includes a first module which is configured to establish a trust relationship with a component of the industrial monitoring system and request a component certificate from the component. The component certificate contains relevant information relating to the component. A second module is configured to check, in interaction with the component, the component certificate on the basis of relevant data stored in a trusted database, and to generate a notification on the basis of the result of the checking process.

16 Claims, 8 Drawing Sheets

(58) Field of Classification Search
CPC ........... G05B 2219/25296; G05B 2219/36542; G05B 19/0428
See application file for complete search history.

(56) References Cited

U.S. PATENT DOCUMENTS

| | | | | |
|---|---|---|---|---|
| 10,587,421 | B2* | 3/2020 | Hojsik | H04L 9/3271 |
| 10,678,950 | B2* | 6/2020 | Bush | G05B 19/048 |
| 10,735,966 | B2* | 8/2020 | Wu | H04L 63/08 |
| 2004/0001593 | A1* | 1/2004 | Reinold | B60R 25/04 |
| | | | | 380/277 |
| 2006/0156391 | A1 | 7/2006 | Salowey | |
| 2008/0082449 | A1 | 4/2008 | Wilkinson et al. | |
| 2010/0325429 | A1 | 12/2010 | Saha et al. | |
| 2019/0236313 | A1 | 8/2019 | Bush et al. | |
| 2021/0091930 | A1* | 3/2021 | Visoky | G06F 21/629 |
| 2021/0176231 | A1* | 6/2021 | Lutz | H04L 12/4625 |
| 2021/0349836 | A1* | 11/2021 | Benedict | G06F 12/1433 |

FOREIGN PATENT DOCUMENTS

| | | | | |
|---|---|---|---|---|
| EP | 2 267 970 | A2 | 12/2010 | |
| EP | 3 518 133 | A1 | 7/2019 | |
| KR | 20230119569 | A * | 6/2023 | G06F 21/35 |

OTHER PUBLICATIONS

Ma, Yongli: "Research on the solution of PKI interoperability based on validation authority"; Computer Science and Service System (CSSS), 2011 International Conference on, IEEE; Jun. 27, 2011.
PCT International Search Report and Written Opinion of International Searching Authority mailed Dec. 13, 2021 corresponding to PCT International Application No. PCT/EP2021/071108 filed Jul. 28, 2021.

* cited by examiner

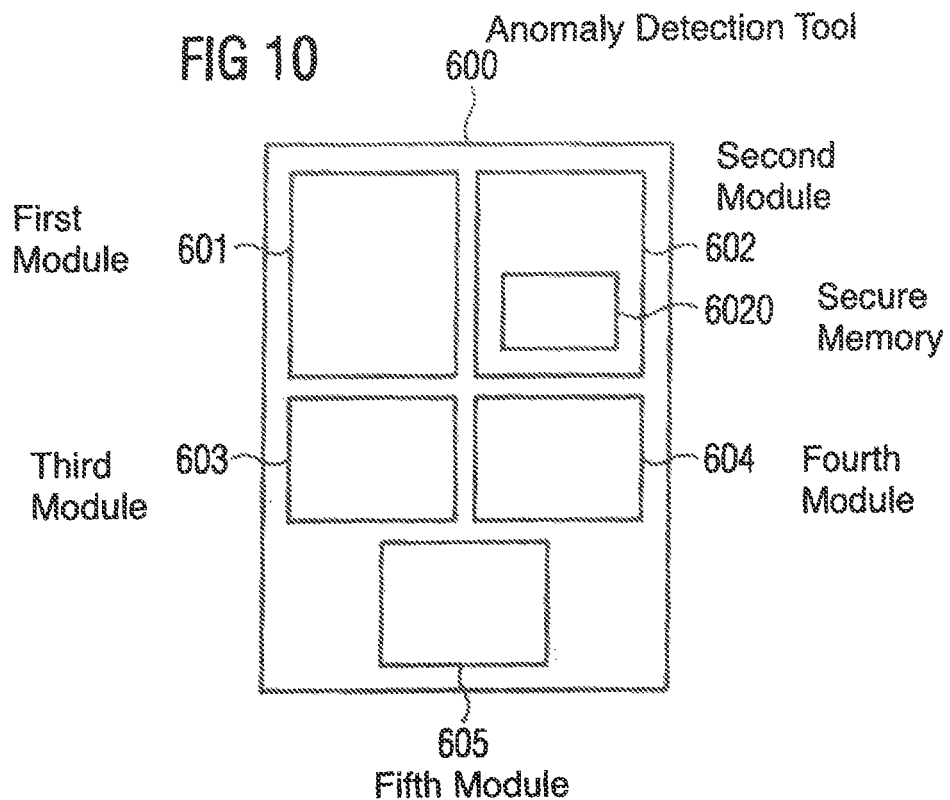
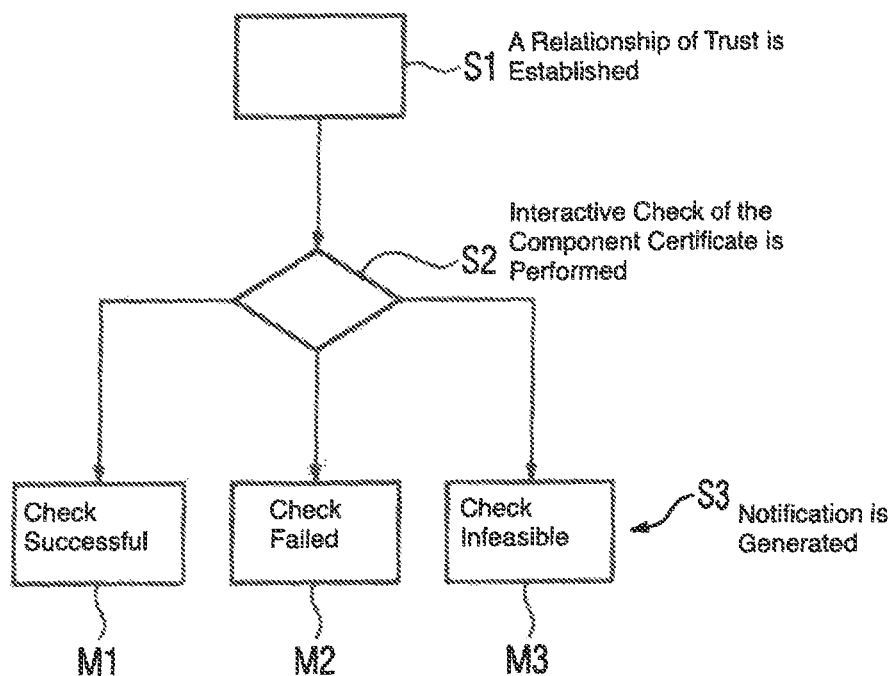

SYSTEM AND METHOD FOR VERIFYING COMPONENTS OF AN INDUSTRIAL MONITORING SYSTEM

CROSS-REFERENCES TO RELATED APPLICATIONS

This application is the U.S. National Stage of International Application No. PCT/EP2021/071108, filed Jul. 28, 2021, which designated the United States and has been published as International Publication No. WO 2022/028975 A1 and which claims the priority of European Patent Application, Serial No. 20189417.7, filed Aug. 4, 2020, pursuant to 35 U.S.C. 119 (a)-(d).

BACKGROUND OF THE INVENTION

The invention relates to a system and a method for verifying components of an industrial monitoring system, preferably an industrial monitoring system of an automation plant, in particular a production or process plant.

The invention additionally relates to a computer-Implemented device inventory and to a computer program.

Systems and methods for linking components to an industrial monitoring system or for connecting components to the network of an industrial plant are known from the prior art. One example of a system such as this is known as a security anomaly detection tool, or anomaly detection tool for short. The security anomaly detection tools are used nowadays not just for their primary purpose (anomaly detection), but increasingly also for automatically detecting the plant components together with the important data thereof in a list/Inventory. The presence of an inventory such as this is explicitly postulated for example in the leading Industrial Security Standard IEC 62443, part 3-3 for the achievement of Security Levels 2 to 4 (in this respect see e.g. the requirement "11.10 SR 7.8-*Control system component inventory: The control system shall provide the capability to report the current list of installed components and their associated properties.*" The advantage of automatic detection of the plant components by security anomaly detection tools compared to manual detection is that it takes place immediately after the connection of the components to the network without any assistance from the plant personnel. As a result, the time needed is greatly reduced, as also is the likelihood of errors. By detecting the plant components in this way, support is provided in particular for replacing devices during runtime, this being a very important scenario in the industrial setting.

The current security anomaly detection tools can if required for instance extract manufacturer-specific device data from the detected network packets that the component sends to the operator station (OS) or the engineering station (ES) and verify it in line with particular criteria. In this case for example the association of a particular device with a particular manufacturer can be checked on the basis of the MAC address assigned by the manufacturer. However, an attacker could also read the MAC address from the packet sent by an original device, insert this MAC address into a self-constructed device and thus masquerade as the original device. Generally speaking, although the MAC addresses are in principle tied to the manufacturers, they have the disadvantage that they can be changed/configured.

Since the security anomaly detection tool—as mentioned above—saves the detected plant components together with the data thereof (including their MAC addresses) in a list/inventory (which in general is not protected), an attacker could however also extract the MAC address for example from the documentation for the original device and misuse it to simulate the identity of an original device.

The aforementioned disadvantages arise because the relevant device data detected by an anomaly detection tool is not sufficiently reliable and trustworthy, meaning that the originality of the plant components detected by the anomaly detection tool, i.e. its identity and the association with the manufacturer thereof, is not unambiguously demonstrable and trustworthy. Thus the replicated and/or manipulated fake devices can be created as original devices in the inventory of a plant and then participate in the communication, although they are not trustworthy and can potentially (because of negligence or deliberately) endanger the system integrity and availability of the plant. In the context of industrial security this makes it necessary to look for solutions that reduce the risk of the aforementioned manipulations (or ideally eliminate them) and thus enable a higher level of protection.

Thus the object of the present invention can be regarded as improving the systems and methods mentioned in the introduction in respect of security.

SUMMARY OF THE INVENTION

The object is inventively achieved with a system of the type mentioned in the introduction, in that the system comprises a first module and a second module, wherein the first module is configured to establish a relationship of trust with a component of the industrial monitoring system and to request a component certificate from the component, wherein the component certificate contains relevant information relating to the component, and the second module is configured to check the component certificate on the basis of relevant data kept in a trustworthy database, wherein the relevant data comprises one or more trust chains and/or one or more certificate blacklists, and in interaction with the component (e.g. In respect of the authenticity of the component), wherein during the check one or more trust chains and/or one or more certificate blacklists are validated, and to respond appropriately to a result of the check. In this case the system can, in response to the result of the check, for example generate a corresponding notification, e.g. an alarm, and/or initiate a corresponding action, e.g. interrupt the communication with the component.

The system can thus check the status (expired/not expired, revoked/not revoked, etc.) of the certificate for the component itself and/or the status of the certificate of the higher-level certification authority (which issued the certificate for the component) and/or the status of the certificate of what is known as the root certification authority (which forms the trust anchor).

On connection of the component, the system, which can for example be embodied as an anomaly detection tool, establishes a preferably confidential connection to the component and prompts the component to send a component certificate to the system, so that the component certificate can be checked interactively by the system (in interaction with the component). The achievement of the object of checking the component certificate in interaction with the component is carried out by the second module. This means that the second module interacts with the component and simultaneously checks the component certificate or interacts with the component during the check on the component certificate, in order to exchange relevant information with the component concerning the check.

In the context of the present disclosure "trustworthy" means "protected against third-party influence/interference", in particular "not manipulable" and "authenticity-protected" or "authentic". A database deemed to be trustworthy within the meaning of this disclosure is characterized in particular in that the (component-specific) entries (for example the name and the serial number of the components along with in particular the status of the check) cannot be manipulated without being noticed.

The establishment of a relationship of trust between the system, for example between the anomaly detection tool and the component, can in this case take place with the help of a whitelist securely stored in the component (for example during commissioning) or by carrying out a certificate-based authentication. If a whitelist is used the component can check whether the anomaly detection tool is entered in the list. In the case of a certificate-based authentication the component can use particular criteria and data securely stored in this component to check whether it trusts the certificate of the anomaly detection tool, by using which the anomaly detection tool authenticates itself to said component, and thus trusts the anomaly detection tool itself. Thanks to the certificate-based authentication a higher level of security or trust can be achieved than by filtering with the help of a whitelist.

The component certificate contains relevant information about the component. However, the relevant information may not exclusively comprise manufacturer-specific information, such as e.g. manufacturer X, device plant Y etc., and/or OEM (Original Equipment Manufacturer)-specific and/or integrator-specific and/or customer-plant-specific or customer-plant-section-specific data.

The component certificate is checked in Interaction with the component and on the basis of the relevant data, which is kept in a trustworthy database. The relevant data (i.e. relevant for the check) can for example be held in a certificate repository of the component manufacturer. In this case the system can for example access the trustworthy database or the certificate repository in order to perform a data reconciliation between the certificate provided by the component and the certificates of the manufacturer from the certificate repository. Depending on the result of the check the system can generate a corresponding notification and/or cause the component to be excluded from communication in the network of the industrial monitoring system.

However, the component certificate may for example not be issued exclusively by an OEM (e.g. by an engineering office), an integrator or in another part of the customer's plant (for example in goods receipt), and thus represent a relationship between the component and this OEM/integrator/the customer's plant.

However, in this case the data relevant for the verification may for example not exclusively comprise manufacturer-specific data, such as e.g. manufacturer "X", device plant "Y", certificate "ABC" etc., and/or OEM-specific data and/or integrator-specific data and/or customer-plant-specific or customer-plant-section-specific data.

Thus all the forms of embodiment described here are also valid if the component certificate relates the component to the OEM/Integrator or the respective customer's plant. Depending on the issuer of the component certificate the corresponding data is used (for the check).

Thus the system has the capability of performing a substantiated and non-manipulable verification of the identity and the originality (the association of plant components with their manufacturers). The verification can be performed ad-hoc (as required, for example immediately after the connection of the component to the network) or cyclically proactively.

In addition the system responds to the result of the check appropriately, in that for example it generates a corresponding notification and/or initiates a corresponding action, e.g. Interruption of the communication with the component.

The verification of the components and consequently the detection thereof in the industrial monitoring system can take place fully automatically using the system.

In connection with the present invention the term "module" means a hardware or software module or a mixture of hardware and software modules.

In particular the first and the second module of the system can in each case be embodied as a software module, for example as a corresponding part of a program code.

In particular a module can comprise physical and/or logical submodules.

In one form of embodiment it may be expedient if the component is configured to use its private key to the component certificate during the check, without disclosing said private key. In this case the component can use a suitable cryptographic method to prove to the system that it (the component) knows the private key to the component certificate (or to the public key contained in the component certificate), without disclosing it.

In one form of embodiment it may be expedient if the system has a secure (e.g. physical or logical) memory or memory location, preferably protected against unauthorized changes or manipulations, and is configured to obtain the relevant data from the trustworthy database, e.g. from the certificate repository of the manufacturer (of the component), at regular intervals or in an event-controlled manner (e.g. triggered by changes to the certificates or the associated trust chains or the blacklists on the part of the manufacturer) via a secure connection and to store or install it in the secure memory.

Generally speaking, the term "secure" In the context of the present disclosure means security in the sense of IT security or "cyber security" (in particular in respect of the three main protection goals of "integrity", "confidentiality" and "availability" and of the protection goal of "authenticity", which plays a major role in this disclosure). A secure component or a secure memory means in particular that said secure component or secure memory is secured against unauthorized accesses by corresponding protection measures/protection mechanisms.

For example, the second module can comprise the more secure (e.g. physical or logical) memory or memory location, in which for example the certificates and the associated trust chains and/or certificate blacklists can be saved. Thus the second module can for example be a physical part, embodied as a physically secure memory, and have a software module, wherein the software module is designed to perform the aforementioned function—obtaining the data relevant to the check and storing or installing it in the secure memory or memory location.

In one form of embodiment it may be provided that the check can have three possible results: "check successful", "check failed" or "check Infeasible".

If the result of the check is "check infeasible", this may for example be because during the comparison of the certificates it emerges that a corresponding certificate is missing from the component manufacturer certificates.

In one form of embodiment it may be provided that the component certificate is a manufacturer device certificate. In contrast to a MAC address, a component certificate and in particular a manufacturer device certificate cannot be successfully manipulated. This means for example that a replicated or manipulated device, which (in contrast to the original device) does not have the private key to the manufacturer device certificate, cannot successfully prove that the manufacturer device certificate belongs to it.

In one form of embodiment it may be advantageous if the relevant data comprises trust chains and/or a certificate blacklist or certificate blacklists, wherein the trust chains should belong to the component certificate. If in this case for example the trust chains are stored in a secure (physical or logical) memory or memory location of the system, the check can take place quickly, in that the component certificate is compared to the stored trust chains of the manufacturer. If the certificate blacklists from the manufacturer are present, the system can also check the revocation status and whether or not the component certificate just checked is blacklisted.

A "trust chain" or "certificate chain" (also called a "chain of trust") is a term with which a person skilled in the art is familiar. In a profile called "Internet X.509 Public Key Infrastructure Certificate and Certificate Revocation List (CRL) Profile", which was developed in the context of RFC 5280, "trust chain" or "certificate chain" is defined as "certification path". In this respect it is stated there: "In general, a chain of multiple certificates may be needed, comprising a certificate of the public key owner (the end entity) signed by one CA, and zero or more additional certificates of CAs signed by other CAs. Such chains, called certification paths, are required because a public key user is only initialized with a limited number of assured CA public keys."

In the context of the present disclosure the term "trust chain" means in particular a list of certificates (certificate chain) which preferably starts with a certificate of an end entity, followed by one or more CA certificates, the last of which is for example a self-signed certificate.

When a trust chain is checked, each certificate from the chain or list is preferably checked or validated.

The certificate chain can have the following properties. Firstly, the issuer of each certificate (apart from the last one) corresponds to the subject of the next certificate on the list. Secondly, each certificate (apart from the last one) should be signed with a private key for the next certificate in the chain, so that the signature of a certificate can be verified with the help of the public key in the following certificate. Thirdly, the last certificate in the list is a trust anchor a certificate that is trusted because it was made available by a trustworthy method. A trust anchor is a CA certificate (or more specifically the public check key of a CA) that is used by a relying party as a starting point for the path validation.

In one form of embodiment it may advantageously be provided that the system comprises a third module, which is configured to accept relevant information from the component certificate into a computer-Implemented device inventory and to characterize this relevant information in accordance with the result of the check, for example to highlight it or provide it with an appropriate status and/or flag.

The third module preferably comprises the computer-implemented device inventory.

In one form of embodiment it may be expedient if the system comprises a fourth module, which is configured to create and/or configure and/or use different check profiles for checking different components, wherein the check profiles characterize a procedure of the checking process.

In the context of the present disclosure the term "check profiles" for example means different methods/procedures which—depending on the component—are employed to perform a check for this component. Thus the check profiles are component-specific check methods that are used to perform the check interactively on the component.

For example, the check for a component, which uses TLS (Transport Layer Security), can in technical terms take the form of a TLS handshake. In this case the component uses its component certificate as a TLS server certificate and proves to the checking authority/the system (e.g. to the anomaly detection tool) in particular that it knows the private key to the public key listed on the certificate, without however disclosing it. Another component, which for example only has capacity for OPC UA (Open Platform Communications Unified Architecture), can for example use a procedure in accordance with OPC UA Part 21 to prove to its counterpart that it knows the private key. To this end a challenge-and-response method can also be used, which could for example also be taken into account in the context of a further profile.

In one form of embodiment it may be provided that the system comprises a fifth module, which is configured, as a function of the result of the check, to create and/or configure and/or use different action profiles, and/or to prevent further communication between the component and/or other plant components.

The object of the invention is also inventively achieved with a computer-Implemented method of the type mentioned in the introduction, in that
  a relationship of trust is established with a component of the industrial monitoring system and a component certificate is requested from the component, wherein the component certificate contains relevant information relating to the component,
  the component certificate is checked in interaction with the component and on the basis of relevant data kept in a trustworthy database, wherein the relevant data comprises one or more trust chains and/or one or more certificate blacklists, wherein during the check one or more trust chains and/or one or more certificate blacklists are validated, and
  an appropriate response is given to a result of the check.

In this case, in response to the result of the check for example a corresponding notification, e.g. an alarm, can be generated and/or a corresponding action initiated, e.g. Interruption of the communication with the component.

In one form of embodiment it may advantageously be provided that during the check the component uses its private key to the component certificate, without disclosing said private key.

In one form of embodiment it may be advantageous if the relevant data and preferably additionally the OEM-specific, integrator-specific or customer-plant-specific data is obtained from the trustworthy database at regular intervals or in an event-controlled manner via a secure connection and is stored or, if it for example contains certificates, installed in a secure memory.

In one form of embodiment it may be expedient if the component certificate is a manufacturer device certificate and/or if the relevant data comprises trust chains and/or one (or more) certificate blacklist(s) for the component certificate.

In one form of embodiment it may advantageously be provided that relevant information is accepted from the component certificate into a computer-implemented device inventory and said relevant information is, in accordance with the result of the check, characterized, for example highlighted or provided with an appropriate status and/or flag. As a result an automated and dynamic setup of the computer-implemented device inventory can take place, wherein device data relevant for the setup and in particular the status of the check can be used.

In one form of embodiment it may be advantageous if different check profiles are created and/or configured and/or used for checking different components, wherein the check profiles characterize a procedure of the checking process or of the checking method.

In one form of embodiment it may advantageously be provided that as a function of the result of the check different action profiles are created and/or configured and/or used, and/or further communication between the component and other plant components is prevented.

As a result the status of the check can be taken into account or visualized for the user. As a result, the user can be involved either directly or indirectly in connection with the configuration of the corresponding profiles for the selection of an appropriate response.

The object is additionally inventively achieved with a computer-implemented device inventory of the type mentioned in the introduction, in that the device inventory comprises at least one component certificate for a component and a notification associated with the component, wherein the notification is generated in accordance with the aforementioned method.

Also disclosed therefore is a computer-implemented method for creating or updating a device inventory. As discussed above, the computer-implemented device inventory can preferably be set up gradually and dynamically, so that it comprises at least one component certificate for a component and a notification associated with the component, said notification being generated in accordance with the method.

The object is as well inventively achieved with a computer program, in that the computer program comprises commands which during the execution of the program by a system causes said system to execute the aforementioned method.

Additionally disclosed is an interactive verification of a component of an industrial monitoring system using a component certificate for the component.

In summary, systems and methods are provided which solve the problem that particular relevant device data, on the basis of which components of an industrial monitoring system are verified, is easily manipulable and thus not trustworthy.

A further aspect of the present disclosure consists in that different checking procedures and checking authorities (which have a relationship of trust to the inventory) can be employed simultaneously in an identical environment. All the components checked in a different manner (for example in accordance with the preconfigured check profiles that are dynamically configurable at runtime) or the relevant data thereof can be entered into a common inventory, so that the user has a uniform overview of all the components in the plant together with the check status thereof.

BRIEF DESCRIPTION OF THE DRAWING

The invention is described and explained in greater detail below on the basis of the exemplary embodiments represented in the figures, in which:

FIG. 10 shows a further anomaly detection tool, and FIG. 11 shows a flow diagram of a method for verifying components.

DETAILED DESCRIPTION OF PREFERRED EMBODIMENTS

Figure 1:
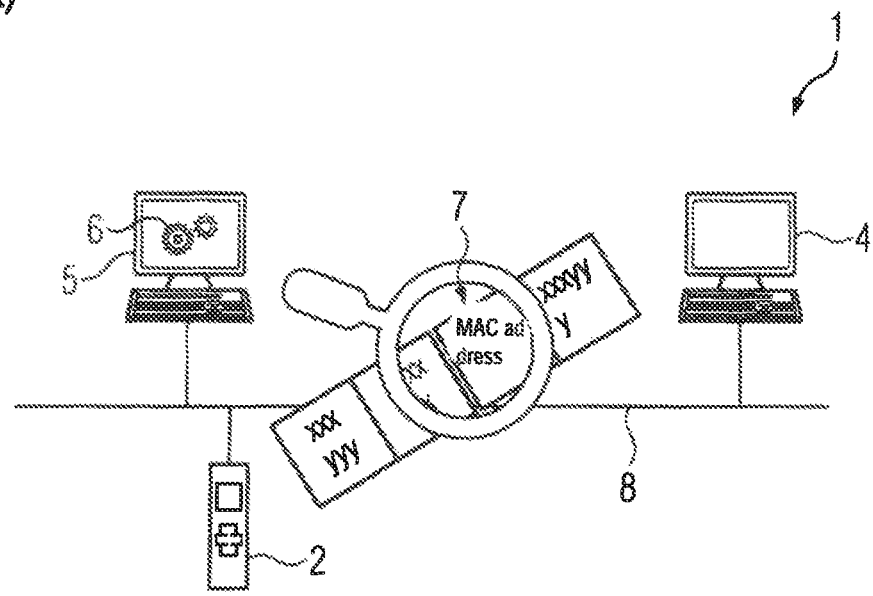
FIG. 1 to FIG. 4 show the verification of plant components by means of anomaly detection tools in accordance with the prior art.

In the exemplary embodiments and figures, identically or identically acting elements can in each case be provided with the same reference characters.

Figure 2:
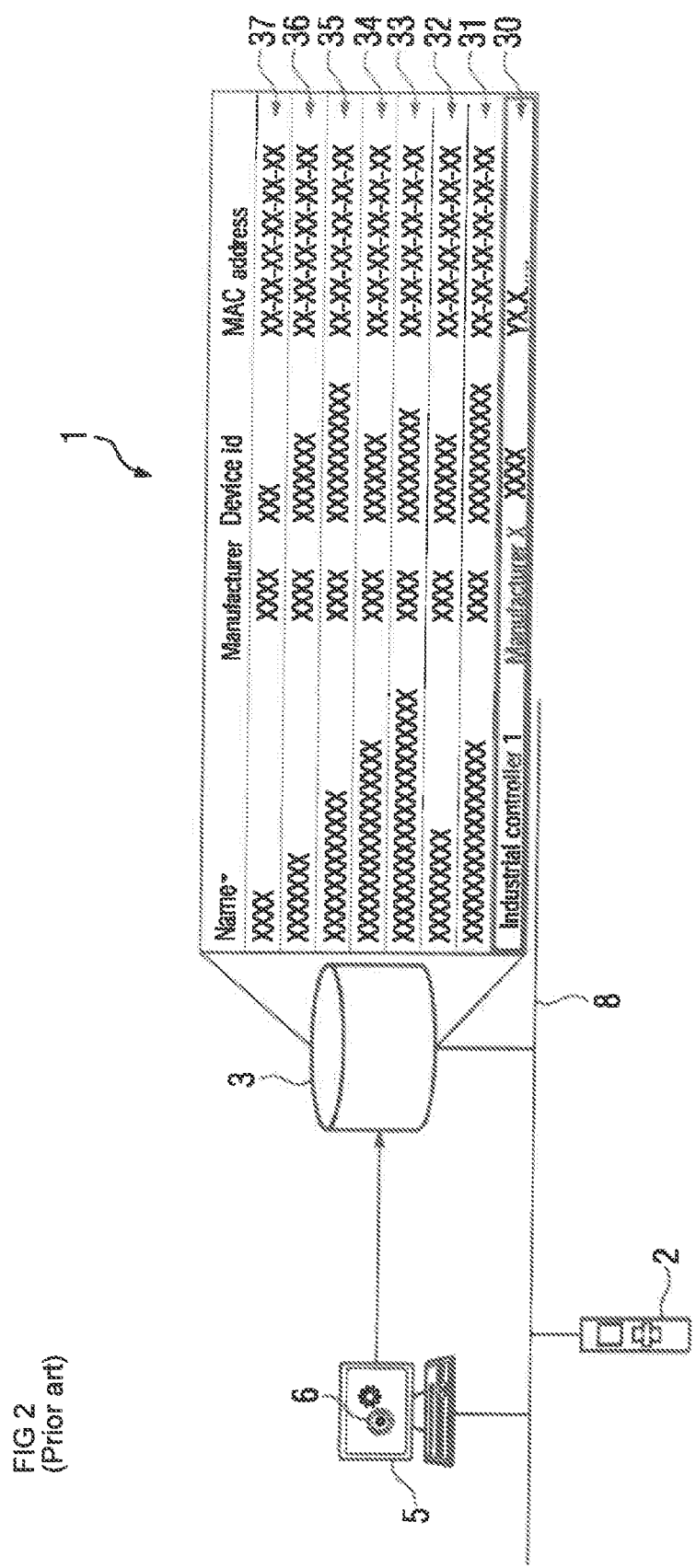

Reference is first made to FIGS. 1 to 4, which briefly outline the prior art. FIGS. 1 to 4 show an industrial monitoring system 1 of an automation plant, in particular a production or process plant. The components of the Industrial monitoring system 1 are for example connected via Industrial Ethernet 8. Obviously the components of the industrial monitoring system 1 can also be connected using other standard types of connection, for example WLAN, Bluetooth, WAN, etc., for the purpose of exchanging information. FIGS. 1 and 2 illustrate a situation in which a (new) device 2 is connected to the industrial monitoring system 1, verified and accepted into a computer-implemented device inventory 3. The device 2 is embodied as an industrial controller.

On connection of the industrial controller 2 to the industrial monitoring system 1 the industrial controller 2 exchanges information with a server 4, which for example has functionalities of an operator station (OS) or an engineering station (ES) and is configured to perform the connection or onboarding of the industrial controller.

Another server 5 has a system 6 for verifying components or devices of the industrial monitoring system 1.

The servers 4 and 5 need not be separate. A single server (not shown here) can contain their functionalities.

The system 6 is embodied as an anomaly detection tool which listens to the traffic between the industrial controller 2 and the OS/ES server 4 in order to read the MAC address 7 of the industrial controller 2. The industrial controller 2 is an original device.

The security anomaly detection tools in accordance with the prior art can if required extract manufacturer-specific device data (e.g. MAC addresses 7) among other things from the detected network packets and verify them in accordance with particular criteria. Among other things, the association of a particular device with a particular manufacturer can in this case be checked on the basis of the MAC address 7 assigned by the manufacturer.

Based on the MAC address 7 read the anomaly detection tool 6 can for example extrapolate the name and the manufacturer of the device 2.

After the anomaly detection tool 6 has used the MAC address 7 to determine the manufacturer-specific information, it creates a new device inventory entry 30 for the device 2 in the computer-implemented device inventory 3. The device inventory normally has multiple entries 30, 31, 32, 33, 34, 35, 6, 37 (FIG. 2).

A device inventory entry 30, 31, 32, 33, 34, 35, 36 or 37 created for a device can for example contain the following (meta-)information:

- the device MAC address 7,
- the device IP address (static or dynamic),
- the device MLFB (static) (MLFB=machine-readable product designation),
- the manufacturer device certificate (MDC) (static),
- the plant-specific or plant-related customer device certificate (CDC),
- the project-related device certificate (PDC) or (if the device is employed in multiple projects) a plurality of such certificates (dynamic),
- project-related operational certificates, that have already been obtained from the device authority (dynamic),
- further information regarding the technical and mechanical features, including as regards the performance and the communication and/or application protocols supported (static and/or dynamic).

The device inventory 3 is generally not protected, so that an attacker can extract the MAC address 7 for example from the documentation for the original device 2 and misuse it to simulate the identity of an original device.

Figure 3:
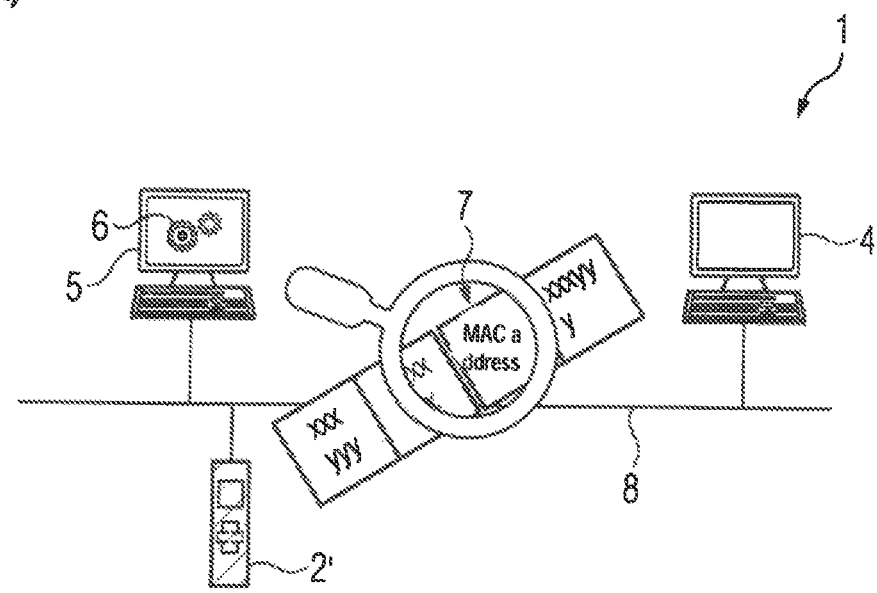
Figure 4:
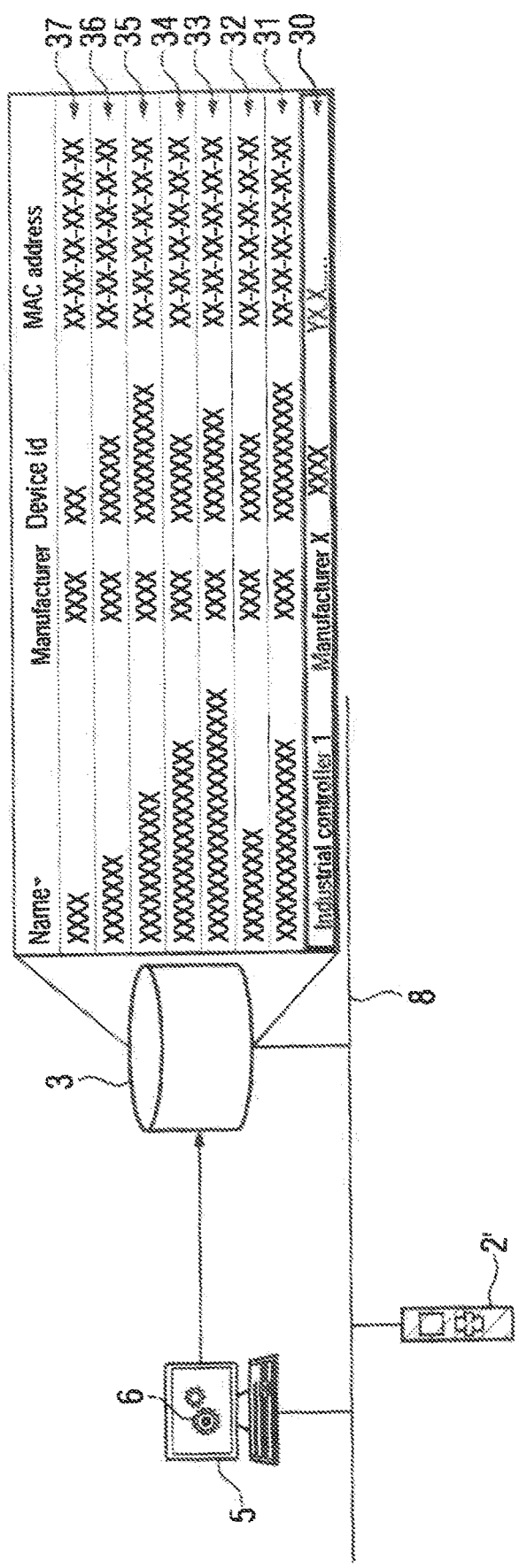

A possible attack of this type is shown in FIGS. 3 and 4.

FIG. 3 illustrates the connection of a manipulated device 2', for example of an industrial controller to the industrial monitoring system 1. The manipulated device 2' can for example be a replicated device. The manipulated device 2' is not an original device 2. Nevertheless the manipulated device 2' has the MAC address 7 of an original device 2.

After the anomaly detection tool 6 has detected the corresponding network packet and extracted the MAC address 7 therefrom, it creates a corresponding device inventory entry 30 in the computer-implemented device inventory 3 (FIG. 4). Since the MAC address 7 of the manipulated device 2' and the MAC address 7 of the original device 2 are identical, the manipulated device 2' is successfully verified, even though it is not an original device 2. The manipulated fake device 2' can then participate as an original device 2 in the communication in the industrial monitoring system 1 of the plant, even though it is not trustworthy and can potentially (because of negligence or deliberately) endanger the system integrity and availability of the plant.

Figure 5:
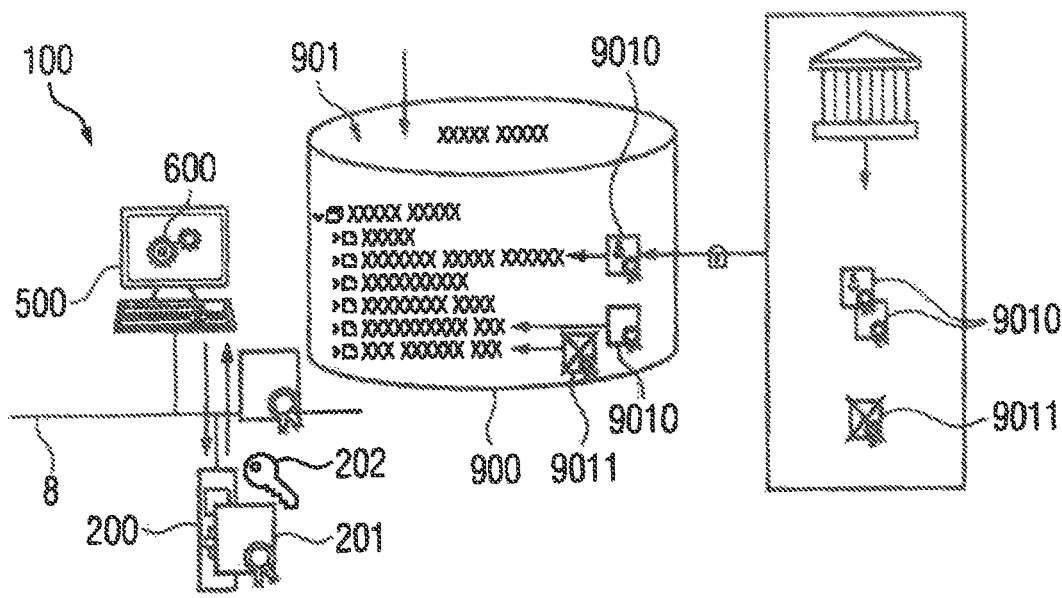
FIG. 5 shows an interactive check of a manufacturer device certificate by an anomaly detection tool.

FIG. 5 shows a section of an industrial monitoring system 100 of an automation plant, in particular a production or process plant. The components of the industrial monitoring system 100 are for example connected via Industrial Ethernet 8. Obviously the components of the industrial monitoring system 100 can also be connected using other standard types of connection, for example WLAN, Bluetooth, WAN, etc., for the purpose of exchanging information.

The industrial monitoring system 100 has a component 200 embodied as an industrial controller, and a server 500.

To verify the component 200 the server 500 has an anomaly detection tool 600, wherein the anomaly detection tool 600 corresponds to the inventive system.

Figure 6:
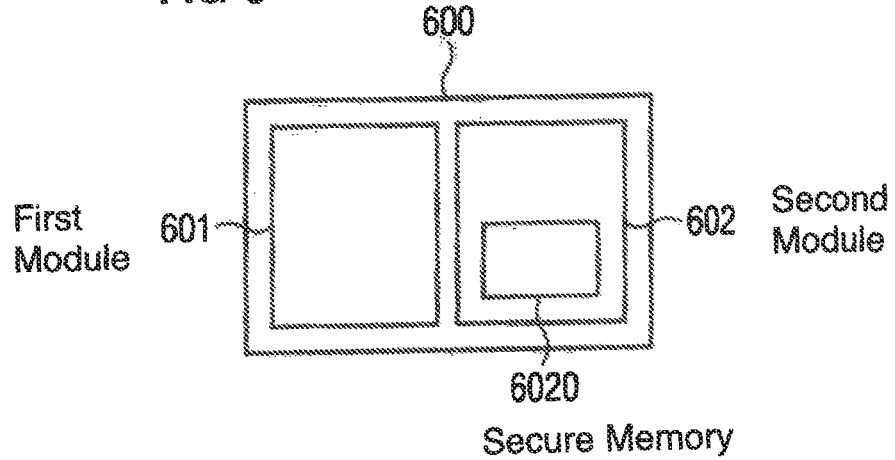
FIG. 6 shows an anomaly detection tool.

The anomaly detection tool 600 comprises a first module 601 and a second module 602 (see FIG. 6). The modules 601 and 602 can for example be embodied as software modules. However, it is also conceivable for at least one of the modules 601, 602 to be embodied as a combination of software and hardware components.

On connection of the component 200 the first module 601 establishes a relationship of trust with the component 200, in order to request a component certificate 201 from the component 200. FIG. 5 shows that the industrial controller 200 can comprise the component certificate 201 with a public key associated with the component certificate 201.

Figure 8:
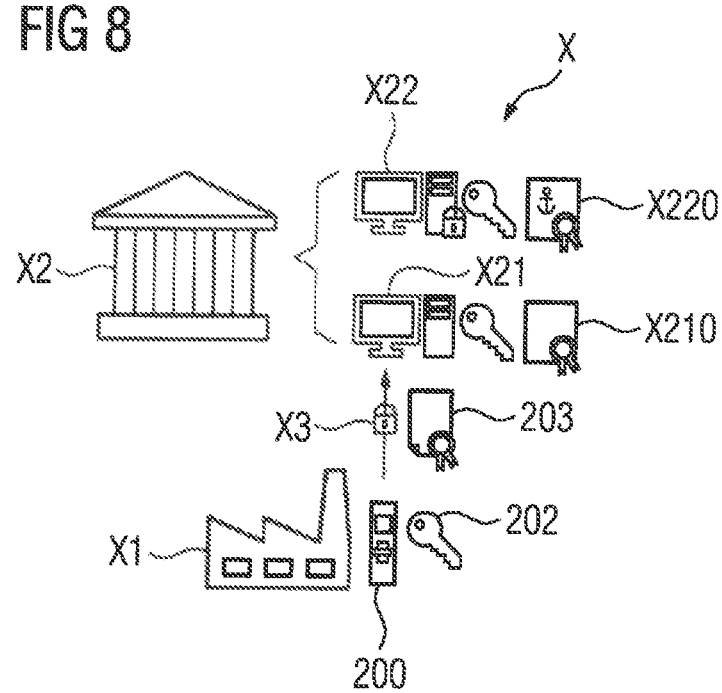
FIG. 8 shows an application for a manufacturer device certificate by a device.
Figure 9:
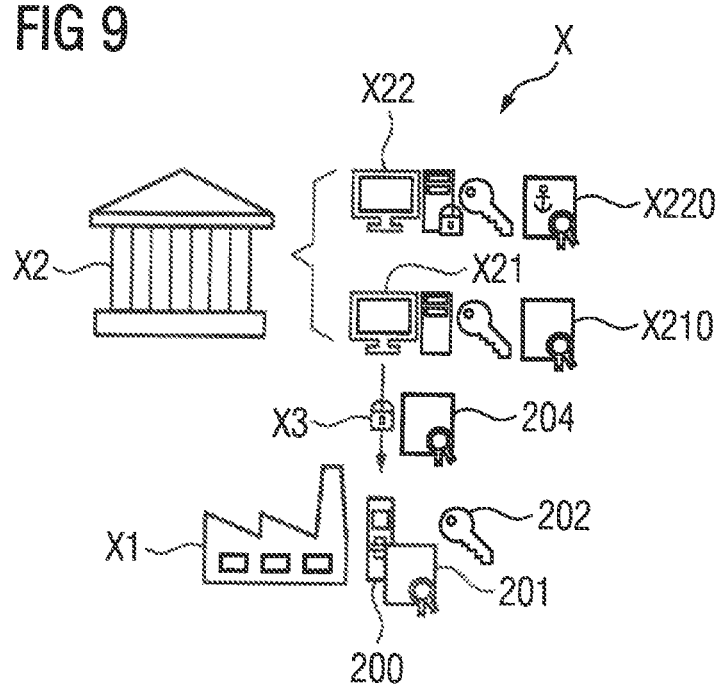
FIG. 9 shows the issue of a manufacturer device certificate.

To illustrate the application for and creation of the component certificate 201 reference is now made to FIGS. 8 and 9. Component certificates such as the component certificate 201 can e.g. be issued and signed by a competent trustworthy issuing certification authority (Issuing CA for short) of the manufacturer. Additionally, component certificates are linked to a unique ID (e.g. a serial number) of the respective component and to a private key, wherein the private key is securely stored in the component/in the device (e.g. software-based) or ideally in the hardware of the component (hardware-based).

Component certificates can for example be placed into the associated components/devices during manufacture in a device plant.

FIGS. 8 and 9 provide a concrete illustration of placement of a component certificate in the form of a manufacturer device certificate (MDC) 201 into an industrial controller 200.

A manufacturer X has/comprises a device plant X1, in which industrial controllers 200 are manufactured, and a public key infrastructure with a trust center X2 for issuing trustworthy certificates.

During the manufacture a private key 202 can be generated in the hardware of the device 200. Using this private key 202 the device 200 can then sign a certificate signing request 203 and send it via a secure communication X3, e.g. encrypted, to a competent issuing certification authority X21, which can e.g. be located in the trust center X2 of the manufacturer X.

The trust center X2 can comprise a root certification authority X22 (Root CA), which can create (self-signed) root certificates/trust anchors X220. The issuing CA X21 can process the certificate signing request 203 and based on this create a component certificate 201. The component certificate 201 can thus be embodied as a chain of certificates. Such certificate chains are also called certification paths or trust chains. The last certificate in the trust chain 201 is a trust anchor X220 issued by the root CA X22.

The certificate signing request 203 generally contains some important device data (e.g. manufacturer-specific device data), in particular the name of the manufacturer ("X") and of the manufacturing plant ("X1"), an ID (e.g. serial number) of the device 200 and the public key for the private key 202 used to sign the certificate signing request 203. The data from the certificate signing request 203 (including the public key) can be transferred by the issuing CA X21 into the issued device certificate 201. After the MDC 201 has been issued it can be transferred by the issuing CA X21 on a secure path X3 to the device plant X1 and then placed onto the device 200 (see FIG. 9).

In light of the above, the component certificate 201 can also contain, apart from the manufacturer-specific device data, in particular the name of the manufacturer ("X") and of the manufacturing plant ("X1"), the serial number of the device 200 and the public key for the private key 202 used to sign the certificate signing request 203, as well as a certificate X210 of the associated, higher-level issuing CA X21, which is responsible for the device plant X1 named "X1", and the root certificate X220 of the associated, higher-level root CA X22, which is responsible for the manufacturer X named "X". All these are examples of the relevant device data (relevant for the check by the anomaly detection tool 600).

Additionally the component certificate 201 can contain the ID (identification) of the applicant/owner, a name of the device, a name of the issuer (of the issuing CA X21) and its period of validity ("valid from . . . to . . . "). One or more of these details can for example be laid down by standards, such as e.g. IEEE 802.1AR 2018 or by manufacturer-specific standards.

Figure 7:
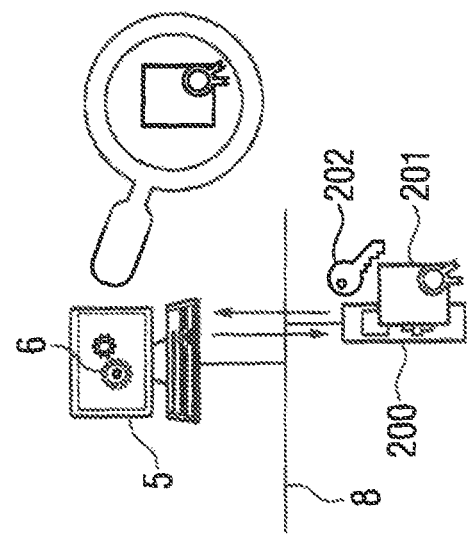
FIG. 7 shows the entry of the check results into a computer-implemented device inventory.

FIGS. 5 to 7 show that the second module 602 checks the component certificate 201. The check takes place interactively. The anomaly detection tool 600 in this case exchanges Information with the component 200. Such Interaction is not provided for in the case of anomaly detection tools 6 in accordance with the prior art (FIG. 1 to FIG. 4). For the check the anomaly detection tool 600 uses relevant, for example manufacturer-specific, data 901, which is kept in a trustworthy database 900. The second module 602, which for example is embodied as a software module, can comprise a corresponding program code which contains commands that on execution of the program code bring about the interactive check of the component certificate 201.

The trustworthy database 900 can for example belong to the manufacturer X of the component 200, e.g. can be embodied as a certificate repository of the manufacturer X.

In addition the anomaly detection tool 600 can have a secure memory 6020, arranged for example in the second module 602, in order to obtain the relevant data 901 from the trustworthy database 900 at regular intervals or in an event-controlled manner, e.g. in the event of a change in the relevant data 901 in the database 900, in a secure manner, e.g. via a secure communication channel, and to store or install it in the secure memory 6020.

The relevant data 901 can comprise (manufacturer-specific) trust chains 9010 for the component certificate 201 and/or certificate blacklists (lists of the blacklisted certificates) 9011.

Based on the relevant data 901 the anomaly detection tool 600 can check the correctness, the consistency and the validity of the contents of the component certificate, perform an identity and originality check on the component 200 and check a revocation status of the component certificate 201.

During the interactive check the component 200 can use its private key to the component certificate 201, without thereby disclosing said private key 202.

The result of the check can for example be: "check successful", "check failed" or "check infeasible".

As a function of the result of the check the anomaly detection tool 600 generates a notification and distributes it for example to a competent authority.

After the check, relevant, e.g. manufacturer-specific, information can be accepted from the checked component certificate 201 into a computer-implemented device inventory 300 and in accordance with the result of the check characterized, for example highlighted or provided with an appropriate status and/or flag. A third module 603 can be provided for this in the case of the anomaly detection tool 600 (see FIG. 10).

The anomaly detection tool 600 can comprise the computer-implemented device inventory 300.

If a check is successful, the relevant, e.g. manufacturer-specific, data (in particular the respective MDCs) can be securely saved with a (first) flag 301 "Identity/Originality: successfully checked"—in the computer-implemented device inventory 300 contained in the anomaly detection tool 800 or in the device inventory of the plant (not shown).

In the event that the check has failed, if for example the component certificate 201 has already been revoked, a corresponding notification can likewise be distributed to the competent authority. In this case the relevant, e.g. manufacturer-specific, data (in particular the respective MDCs) subject to the check—provided with a (second) status/flag 302 (e.g. "Identity/Originality: check failed")—can be securely stored in the anomaly detection tool's 600 own integrated inventory 300 or in the inventory of the plant (not shown here).

If a check is infeasible, for example because of the absence of the component certificate 201 and/or of the associated private key, a corresponding notification (to the effect that the check is infeasible and that the device 200 cannot therefore be demonstrated to be trustworthy) can likewise be generated and sent to a competent authority. In this case the available (unchecked) relevant data—provided with a (third) status/flag 303 (e.g. "Identity/Originality: check infeasible")—can be accepted into the inventory 300 or a dedicated plant inventory (not shown here).

FIG. 10 shows that the anomaly detection tool 600 can comprise a fourth module 604, which is configured to create and/or configure and/or use different check profiles for checking different components, wherein the check profiles characterize a procedure of the checking process. This is always advantageous in cases in which different manufacturers have implemented different checking methods in their devices.

It can be seen from FIG. 10 that the anomaly detection tool 600 can comprise a fifth module 605, which is configured to create and/or configure and/or use different action profiles as a function of the result of the check, and/or—in particular in an especially critical environment—to prevent further communication between the component and/or other plant components, e.g. If the check has failed or is infeasible.

FIG. 11 shows a flow diagram of a form of embodiment of the inventive method for verifying components of an industrial monitoring system. In this case firstly (step S1) a relationship of trust is established with a component of the industrial monitoring system and a component certificate is requested from the component, wherein the component certificate contains relevant, e.g. manufacturer-specific, information relating to the component.

Following this an interactive check of the component certificate is performed (step S2) on the basis of relevant, e.g. manufacturer-specific, data kept in a trustworthy database. Then on the basis of a result of the check a notification is generated (step S3).

FIG. 11 shows an example of the method, in which the check has three possible outcomes: M1 ("check successful"), M2 ("check failed") and M3 ("check infeasible").

The method Illustrated in FIG. 11 with steps S1 to S3 can be performed for example in the environment described in FIGS. 5 to 10 by means of the anomaly detection tool 600.

Although the invention has been illustrated and described in detail using exemplary embodiments, the invention is not restricted by the disclosed examples. Variations thereof can be derived by the person skilled in the art, without departing from the scope of protection of the invention, as defined by the claims below. In particular, the described anomaly detection tool and the industrial monitoring system can be supplemented by features of the method and the method by features of the anomaly detection tool and of the industrial monitoring system.

What is claimed is:

1. A system for verifying components of an industrial monitoring system, the system for verifying components comprising:

a first module configured to establish a relationship of trust as a confidential connection with a component of the industrial monitoring system, and to request a component certificate from the component, with the component certificate containing relevant information relating to the component;

a second module configured to check the component certificate based on relevant data kept in a trustworthy database and comprising one or more trust chains and/or one or more certificate blacklists, and in interaction with the component, to validate during the check one or more trust chains and/or one or more certificate blacklists, and to respond appropriately to a result of the check;

a further module configured to prevent further communication between the component and other plant components as a function of the result of the check; and a secure memory configured to obtain the relevant data from the trustworthy database at regular intervals or in an event-controlled manner via a secure connection and to store or install the relevant in the secure memory, wherein the second module comprises the secure memory.

2. The system of claim 1, wherein the secure memory is embodied as a memory protected against unauthorized changes or manipulations.

3. The system of claim 1, wherein certificates and trust chains and/or certificate blacklists associated with the certificates are saved in the secure memory.

4. The system of claim 1, wherein the trustworthy database is embodied as a certificate repository of the manufacturer of the component.

5. The system of claim 1, wherein the component certificate is a manufacturer device certificate.

6. The system of claim 1, further comprising a third module configured to accept relevant information from the component certificate into a computer-implemented device inventory and to highlight the relevant information or provide the relevant information with an appropriate status and/or flag in accordance with the result of the check.

7. The system of claim 1, further comprising a fourth module configured to create and/or configure and/or use different check profiles for checking different components, wherein the check profiles characterize a procedure of the checking process.

8. The system of claim 1, wherein the further module comprises a fifth module configured to create and/or configure and/or use different action profiles.

9. The system of claim 1, wherein the component is configured to use its private key to the component certificate during the check, without disclosing said private key.

10. A computer-implemented method for verifying components of an industrial monitoring system, the computer implemented method comprising:

establishing with a first module, a relationship of trust as a confidential connection with a component of the industrial monitoring system;

requesting, with the first module, a component certificate from the component, wherein the component certificate contains relevant information relating to the component;

checking, with a second module, the component certificate in interaction with the component and based on relevant data kept in a trustworthy database, wherein the relevant data comprises one or more trust chains and/or one or more certificate blacklists;

validating, with the second module, during the check one or more trust chains and/or one or more certificate blacklists;

giving with the second module, an appropriate response to a result of the check;

preventing, with a further module further communication between the component and other plant components as a function of the result of the check;

obtaining, with a secure memory, the relevant data from the trustworthy database at regular intervals or in an event-controlled manner via a secure connection; and storing or installing the relevant data in the secure memory, wherein the second module comprises the secure memory.

11. The method of claim 10, wherein the component certificate is a manufacturer device certificate.

12. The method as claimed in one of claim 10, further comprising:

accepting relevant information from the component certificate into a computer-implemented device inventory; and highlighting the relevant information or providing an appropriate status and/or flag for the relevant information in accordance with the result of the check.

13. The method of claim 10, further comprising creating and/or configuring and/or using different check profiles for checking different components, wherein the check profiles characterize a procedure of the checking process.

14. The method of claim 10, further comprising:

creating and/or configuring and/or using different action profiles as a function of the result of the check.

15. A computer-implemented device inventory comprising at least one component certificate for a component and a result of a check associated with the component in accordance with a method of claim 10.

16. A computer program embodied on a non-transitory computer readable medium comprising commands, which when executed by a system, cause the system to execute a method as set forth in claim 10.

* * * * *